(12) United States Patent
Casebolt et al.

(10) Patent No.: US 7,113,087 B1
(45) Date of Patent: Sep. 26, 2006

(54) PROXIMITY SENSING BASED ON ANTENNA IMPEDANCE VARIATION

(75) Inventors: Mark W. Casebolt, Seattle, WA (US); Craig S. Ranta, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 681 days.

(21) Appl. No.: 10/408,125

(22) Filed: Apr. 8, 2003

(51) Int. Cl.
G08B 1/08 (2006.01)

(52) U.S. Cl. .............................. 340/539.1; 340/636.11; 455/281; 343/861; 343/860

(58) Field of Classification Search .............. 340/539.1
See application file for complete search history.

(56) References Cited

U.S. PATENT DOCUMENTS

| | | | | |
|---|---|---|---|---|
| 3,750,125 | A | * | 7/1973 | Ross et al. ................... 340/561 |
| 5,396,443 | A | | 3/1995 | Mese et al. |
| 5,606,624 | A | * | 2/1997 | Damato ................. 340/825.36 |
| 5,669,004 | A | | 9/1997 | Seller |
| 5,757,271 | A | * | 5/1998 | Andrews ................. 340/539.1 |
| 6,172,354 | B1 | | 1/2001 | Adan et al. |
| 6,303,924 | B1 | | 10/2001 | Adan et al. |
| 6,366,204 | B1 | * | 4/2002 | Zannier ...................... 340/561 |
| 6,570,610 | B1 | * | 5/2003 | Kipust ......................... 348/156 |
| 6,703,599 | B1 | * | 3/2004 | Casebolt et al. ............ 345/166 |
| 6,859,196 | B1 | | 2/2005 | Kehlstadt |
| 2002/0035701 | A1 | | 3/2002 | Casebolt et al. |
| 2002/0126094 | A1 | | 9/2002 | Junod et al. |

* cited by examiner

*Primary Examiner*—Thomas Mullen
*Assistant Examiner*—Eric M. Blount
(74) *Attorney, Agent, or Firm*—Banner & Witcoff, Ltd.

(57) ABSTRACT

Proximity of a user body part can be detected by measuring the effects such proximity has on antenna impedance mismatches. The amount of mismatch affects the amount of RF signal energy reflected back into a transmission line connecting the antenna to a RF signal source. A directional coupler has a main line electrically connected to the transmission line, as well as a coupled line. The directional coupler produces a signal on its coupled line in relation to the magnitude of reflected energy on the transmission line; the amount of reflected energy varies in response to how well the antenna impedance matches the transmission line impedance. A signal detector is electrically connected to the coupled line, and responds to signals produced in the coupled line by the main line. The signal detector output is then used to determine whether a body part is in proximity. Other aspects the invention include an adaptive algorithm to adjust a threshold for proximity determination.

43 Claims, 5 Drawing Sheets

| Presumed Condition | $P_T{}^*$ | $P_R{}^*$ |
|---|---|---|
| hand near | low | high |
| hand not near | high | low |

*assumes constant $P_F$

PROXIMITY SENSING BASED ON ANTENNA IMPEDANCE VARIATION

FIELD OF THE INVENTION

This invention relates to systems and methods for proximity detection in electronic devices. More particularly, this invention relates to systems and methods for detecting the approach or presence of a user by measuring effects of changes in antenna impedance matching.

BACKGROUND OF THE INVENTION

Detecting proximity or approach of a user's hand (or other body part) permits an electronic device to automatically change from one state to another based upon that approach or proximity. One important application for this is in conjunction with power management. For example, a device can be configured to have "sleep" and "awake" states. During a sleep state, which can correspond to periods of device non-use, various components and functions can be turned off so as to minimize power consumption. Non-use of a device often corresponds to periods when a user is not holding or near the device. If the device can detect the user's presence and/or contact, the device can be configured to automatically awaken (or remain awake) when the user is present and to sleep when the user is not present. In some applications, changes in hand or body part proximity may occur infrequently. Detecting and interpreting a change in proximity conditions could similarly facilitate re-evaluation of a power (or other) state.

Wireless computer input devices such as a computer mouse are but one example of a device in which power consumption is a concern. Typically, a computer mouse includes motion detection components, internal circuitry for converting the detected motion into data for transmission to a computer, and one or more buttons, scroll wheels, etc. In the case of a wireless mouse, the mouse further contains circuitry for wireless (typically RF) communication with a receiver that is connected to a computer. All of these mouse components require power to function, and the mouse consumes more power if these components are used more frequently. At the same time, wireless computer input devices have a limited battery power supply. Nevertheless, because of the added convenience offered by such devices, wireless computer mice and other peripherals are becoming increasingly popular with computer users.

Power consumption can be especially critical in optically tracking wireless mice. Unlike earlier designs in which motion is detected by a pair of encoder wheels that are rotated by a rolling ball, optical mice do not require moving parts to detect motion (other than the mouse itself relative to some surface). Instead, an optical mouse takes a series of images of the surface over which it moves, and then compares the images to determine the direction and magnitude of motion. Examples of such optical input devices and related signal processing are described in, e.g., U.S. Pat. No. 6,303,924 (titled "Image Sensing Operator Input Device") and U.S. Pat. No. 6,172,354 (titled "Operator Input Device"). As described in those patents, an array of photosensitive elements generates an image of a desktop (or other surface) portion when light from an associated illumination source reflects from the desktop or other surface. Although optical input devices offer numerous advantages over devices that mechanically encode motion, optical devices often consume more power than mechanical designs. It is therefore advantageous if a wireless optical mouse can sleep or otherwise enter a reduced power mode when not in use. Unlike some wireless computer mice employing mechanical encoder wheels, however, periodically testing for mouse motion as a method of waking a sleeping optical mouse is problematic. Instead of sampling motion detector elements for an indication of recent movement, the proximity of a user's hand can be used as an indicator that the mouse must wake up.

Various types of user proximity detectors are known and used in power management systems and other applications. For example, Mese et al. U.S. Pat. No. 5,396,443 discloses power saving control arrangements for an information processing apparatus. More specifically, the Mese et al. patent describes various systems for (1) detecting the approach (or contact) of a user associated medium to (or with) the apparatus; (2) placing a controlled object of the apparatus in a non-power saving state when such contact or approach is detected; and (3) placing the controlled object in a power saving state when the presence of the user associated medium (i.e., a stylus pen or part of a user's body) is not detected for a predetermined period of time. The '443 patent describes various types of approach/contact sensors. Among these, various "tablet" type sensor systems are described, including electromagnetic, capacitance, and electrostatic coupling tablets. In one embodiment, a contact or approach detecting tablet, and a flat display panel, may be integrally formed with a housing of the information processing apparatus.

Sellers U.S. Pat. No. 5,669,004 discloses a system for reducing power usage in a personal computer. More specifically, a power control circuit is disclosed for powering down portions of a personal computer in response to user inactivity, and for delivering full power to these portions once user activity is detected via one or more sensors. In the primary embodiment that is disclosed, the sensor is a piezoelectric sensor fitted into a keyboard. Sellers discloses that sensors may be positioned at other locations on the computer (a monitor, mouse, trackball, touch pad or touch screen) and that various other kinds of sensors (capacity, stress, temperature, light) could be used instead of piezoelectric sensors.

Commonly owned Casebolt et al. U.S. patent application Ser. No. 09/948,099, filed Sep. 7, 2001 and published under No. 20020035701 on Mar. 21, 2002, discloses capacitive sensing and data input device power management systems and methods. In the disclosed embodiments, capacitive proximity sensing is carried out by detecting a relative change in the capacitance of a "scoop" capacitor formed by a conductor and surrounding ground plane. The conductor may be a plate provided in the form of an adhesive label printed with conductive ink. Charge is transferred between the scoop capacitor and a relatively large "bucket" capacitor, and a voltage of the bucket capacitor is applied to an input threshold switch. A state transition from low to high (or high to low) of the input threshold is detected, and a value indicative of the number of cycles of charge transfer required to reach the state transition is determined. The presence or absence of an object or body portion in close proximity to or in contact with a device can be determined by comparing the value with a predetermined threshold. The predetermined threshold can be adjusted to take into account environmentally induced changes in capacitance of the scoop capacitor.

Junod et al. U.S. patent application Ser. No. 10/124,892, filed Apr. 17, 2002 and published under No. 20020126094, discloses a computer input device with a capacitive antenna. Electrodes are disposed within and/or on the device housing.

Proximity of a user's hand and/or direct contact by a hand causes changes in capacitance, which are then used to awaken the input device from a sleep mode. The capacitive electrodes are also used as a capacitive antenna for data transmission by the input device. Although the '892 application refers to use of an inductive antenna and inductive detection circuit, no description of such a system is provided.

SUMMARY OF THE INVENTION

The present invention provides a simple system and method for proximity detection representing a desirable alternative to the capacitive and other sensing systems and methods referred to above. More particularly, the present invention provides a system and method for detecting the presence of a hand or other body part based on changes in antenna impedance caused by the proximity of a hand or body part. Such changes in antenna impedance affect the amount of RF signal energy that the antenna reflects back into a transmission line connecting the antenna to a RF signal generator. Among other benefits, the present invention offers a potentially simpler and more economic manner of detecting presence of a user that, when used with wireless devices, can avoid or reduce the need for separate sensing components. In one embodiment, the proximity detection system includes a RF signal source. A transmission pathway connects the RF source to an antenna. A directional coupler has a main line electrically connected to the transmission pathway, as well as a coupled line. The directional coupler produces a signal on the coupled line in response to changes in antenna and transmission line impedance mismatching caused by the presence of an object or body portion. A signal detector is in electrical communication with the coupled line, and responds to signals produced in the coupled line by the main line. The signal detector produces an output signal that is within an output range, the output range corresponding to a range of antenna-transmission line impedance mismatch. A controller is in communication with the signal detector and configured to provide, in relation to the output signal, a state signal indicative of the presence or absence of an object or body portion.

A proximity detector according to the invention can also be incorporated into an input device having a controller that generates data signals in response to manipulation of the device by a user. A RF signal source provides modulated RF signals for transmission of the data signals to another device, and the proximity detection is based upon the amount of the modulated RF signal that is reflected by the antenna because of impedance mismatch. The invention further includes a method for determining proximity of a human body part to an electronic device that communicates by wireless RF transmission with a separate device. Modulated RF signals are transmitted through a transmission line to an antenna so as to communicate data to the separate device. Detection signals are generated based on amounts of the modulated RF signal energy that is reflected back into the transmission line by the antenna. State signals indicative of the proximity of a user body part are generated in relation to the detection signals.

Additional aspects of the invention include an algorithm to automatically adjust the threshold for determining a relative change from a user-present to a user-absent condition (or vice versa). This permits adaptation to changing and unpredictable variations in the RF absorption characteristics of the environment and among different users. Additional features of the invention are described herein and/or will be evident to persons skilled in the art in light of the following description and attached drawings.

DETAILED DESCRIPTION OF THE PREFERRED EMBODIMENTS

An application of the invention within a wireless, optically tracking computer mouse is described by way of example. However, the invention has much wider-ranging application, and can be used in numerous devices wherein it would be advantageous to conserve battery power during periods of non-use. The invention also has useful application in other data input devices, both portable and non-portable. The invention finds particularly useful application (but is not limited to) battery powered devices which communicate via RF transmission, which are intermittently used, and which are generally left on over extended periods of time so as to provide ready usability when needed. Such devices include (but are not limited to) portable computers, personal data assistants (PDAs), tablet computers, cellular phones, pagers and wireless computer peripherals, e.g., mice and keyboards. The proximity sensing aspects of the present invention are not limited to power management, and can also be implemented in virtually any device (data input device or otherwise) where it is desired to determine the presence or non-presence of an object or body portion in close proximity to another object. By way of example and not limitation, a portable computer in a wireless network could be configured to display a blank screen when the user is no longer present. The computer could then require a password to re-access the computer, thereby preventing unauthorized access when the proper user is not present.

Figure 1:
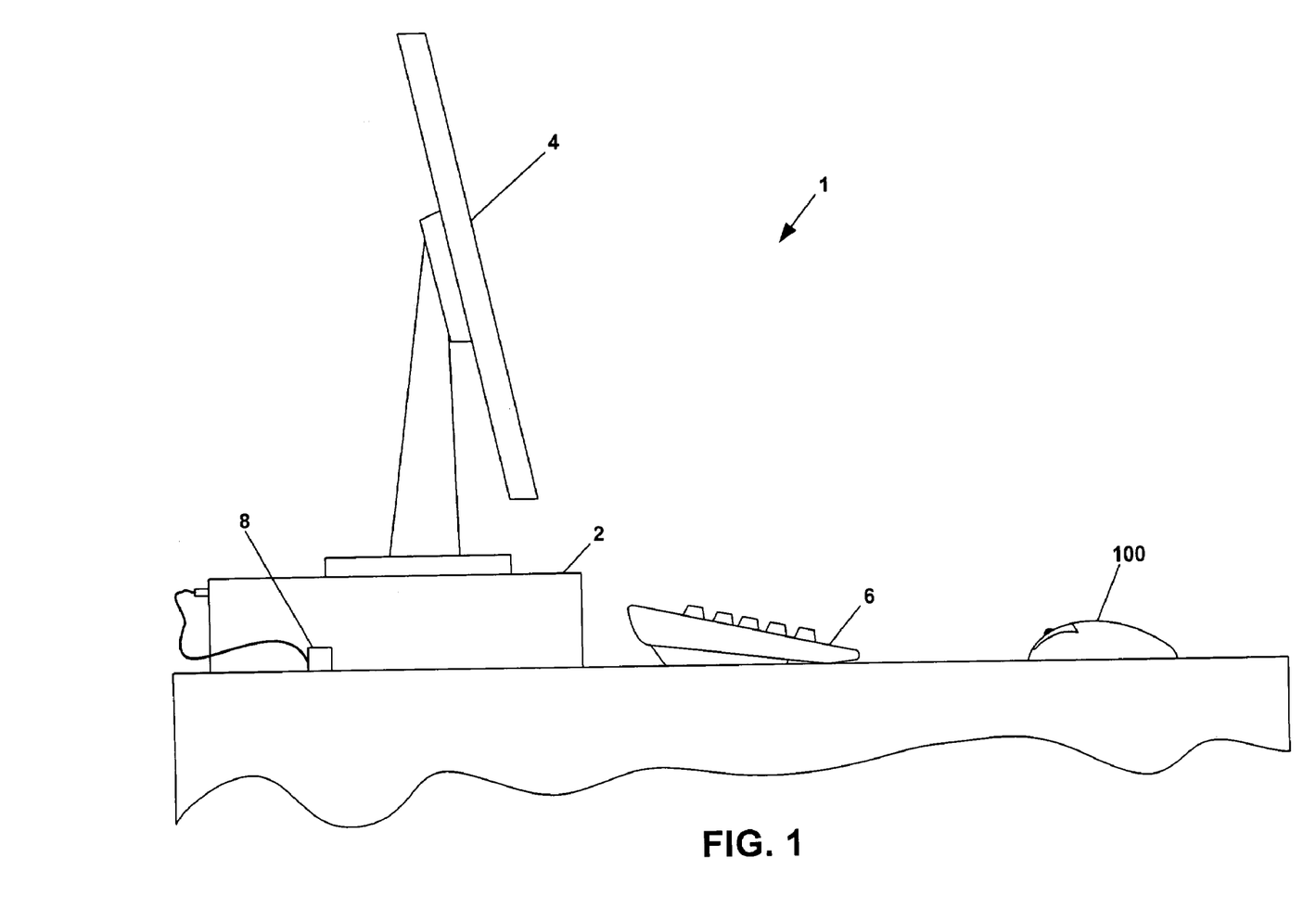
FIG. 1 is a diagrammatic side elevational view of a computing system environment according to one embodiment of the invention.

FIG. 1 illustrates a computing system environment 1 in which the invention could be implemented. Computing system environment 1 is only one example of an application for the invention, and is not intended to suggest any limitation as to the scope of use or functionality of the invention. Shown in FIG. 1, in side view, are a desktop computer 2 having a monitor 4 and a keyboard 6. Also shown is a wireless mouse 100, which communicates with computer 2 via a RF transmitter within mouse 100 (not shown in FIG. 1) and a RF receiver 8. Receiver 8 may be connected to a Universal Serial Bus (USB) or other port of computer 2 and be external to computer 2 (as shown), or may alternately be internal to computer 2.

Mouse 100 encodes movement of the mouse across a desktop or other surface into data, which is then modulated into a RF signal and transmitted to computer 2. Similarly, movements of a mouse button, of a scroll wheel or of other input mechanisms on mouse 100 are also converted into data and transmitted via modulated RF signal to computer 2. In some embodiments, receiver 8 may be a transceiver and also transmit data to mouse 100 via modulated RF signals, providing two-way wireless communication between computer 2 and mouse 100. For example, computer 2 could signal mouse 100 to retransmit data in the event of an error, poll mouse 8 and any other wireless devices communicating with computer 2, and periodically inquire for the presence of new wireless devices seeking to establish a wireless link with computer 2. In one preferred embodiment, computer 2 communicates with mouse 100 in accordance with the BLUETOOTH standard for wireless communications, as described in, e.g., "Specification of the Bluetooth System," version 1.1 (dated Feb. 22, 2001), available from Bluetooth SIG, Inc. at <http://www.bluetooth.com>, and operates at frequencies between 2.4 GHz and 2.483 GHz. The present invention may be implemented in systems operating at many frequencies, but finds particularly advantageous application to frequencies above 850 MHz, including frequencies between 5.725 GHz and 5.850 GHz.

Figure 2:
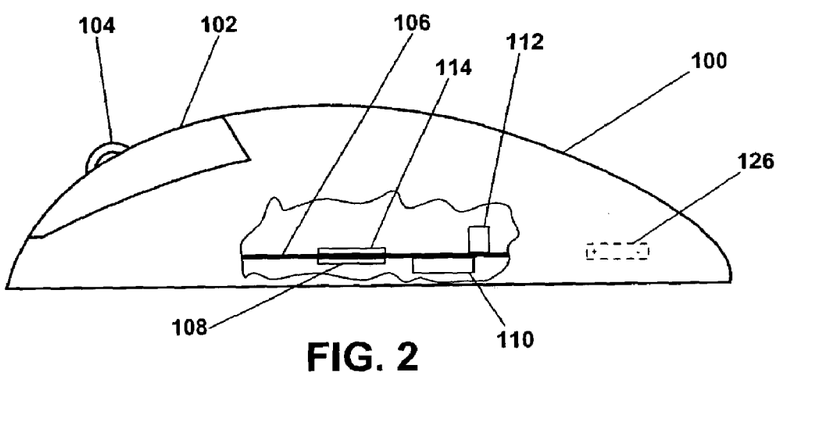
FIG. 2 is a diagrammatic cutaway side view of the wireless mouse of FIG. 1.

FIG. 2 is a side, cutaway view of mouse 100. Mouse 100 may have one or more buttons 102 which can be pressed by a user, a scroll wheel 104, or other types of input controls which can be actuated by a user. The number, arrangement and types of input controls shown are merely exemplary, and other combinations and arrangements are within the scope of the invention. The operation of switches, scroll wheels and other types of input controls is known in the art and thus not further described herein. Mouse 100 may also have one or more internal circuit boards 106 or other substrates upon which various electronic components are connected and physically supported. These components may include an imaging array/processor 108, a light source 110, a RF antenna 112, a controller 114 and a battery/power supply 126. Other components, not shown in FIG. 2, may include memory and other electrical components. Light source 110 could be a light emitting diode, laser or other light source. Light source 110 emits light which illuminates an area of a desktop or other surface, and which is imaged by imaging array/processor 108. Imaging array/processor 108 includes light sensitive elements to detect the amount of light received, as well as circuitry to perform image processing and comparison. In alternative embodiments, the image comparison and/or other image processing could be performed by controller 114 or by other components. Images from a portion of a desk top or other surface are compared to detect movement of mouse 100 across the desktop or other surface. Although an imaging mouse is described by way of example, the invention is not limited to devices which detect motion by imaging. In other embodiments, motion could be detected using laser speckle with a spatial filtering algorithm and a linear photodetector array. In still other embodiments, laser Doppler velocimetry can be used to mix a reflected and incident laser beam and determine the velocity from the Doppler shift frequency. Indeed, and as previously set forth, the invention is not limited to computer input or to motion detecting devices.

Figure 3:
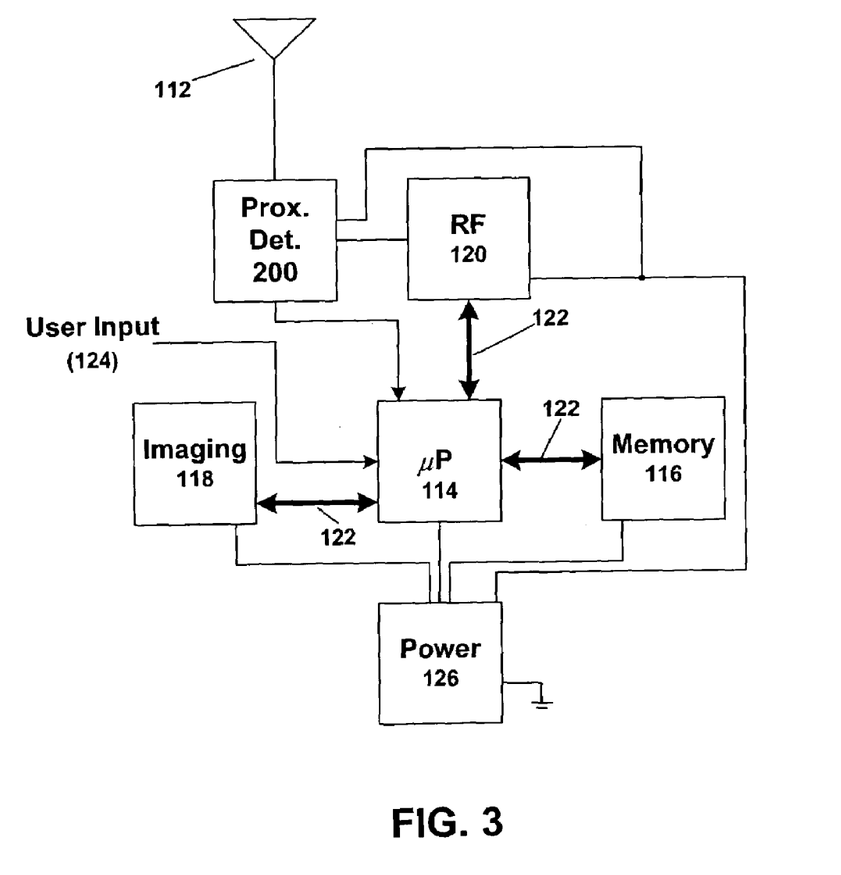
FIG. 3 is a block diagram for circuitry of the mouse of FIGS. 1 and 2.

FIG. 3 is a block diagram of the internal circuitry of mouse 100 according to one embodiment of the invention. Operation of mouse 100 is controlled by a microprocessor (μP) controller 114. Although controller 114 is shown as a microprocessor, controller 114 could alternatively include state machine circuitry or other suitable components capable of controlling operation of mouse 100 as described herein. Controller 114 communicates with memory 116. Memory 116, which may include volatile and non-volatile memory, is used for storage of software (or firmware) instructions, imaging data and proximity detection data (as discussed in more detail below). Memory 116 may include a non-volatile component, such battery-backed SRAM or EEPROM. Controller 114 also controls light source 110 (FIG. 2) and imaging array/processor 108 (FIG. 2), both of which are represented collectively by block 118. Controller 114 further controls RF communication circuitry 120, passing data to RF communication circuitry 120 for communication to computer 2 over antenna 112. Similarly, data communicated to mouse 100 (if mouse 100 is capable of two-way communication) is received via antenna 112 and RF circuitry 120, and transmitted to controller 114. RF circuitry 120 can include components for converting data to modulated RF signals (and vice versa), for amplifying RF signals, and for performing other functions. Controller 114 communicates with imaging elements 118, RF circuitry 120 and memory 116 over one or more buses 122, shown collectively as bold bi-directional arrows. Controller 114 also receives electrical signals that correspond to a user's actuation of a mouse button 102 (FIG. 2), scroll wheel 104 (FIG. 2) or other input control. These electrical signals are represented collectively by User Input 124. The various electrical components of mouse 100 are powered by a power supply 126, which could include one or more batteries.

Although FIG. 3 shows controller 114, imaging circuitry 118, RF circuitry 120 and memory 116 as discrete components, this need not be the case. For example, one or more of these components might be contained in a single Integrated Circuit (IC) or other component. As another example, controller 114 may include internal program memory such as ROM. Similarly, the herein described functions of these components could be distributed across additional components (e.g., multiple controllers or other components), and/or redistributed among the components shown. As but one example, certain components of RF circuitry 120 could be included as part of controller 114.

Figure 4:
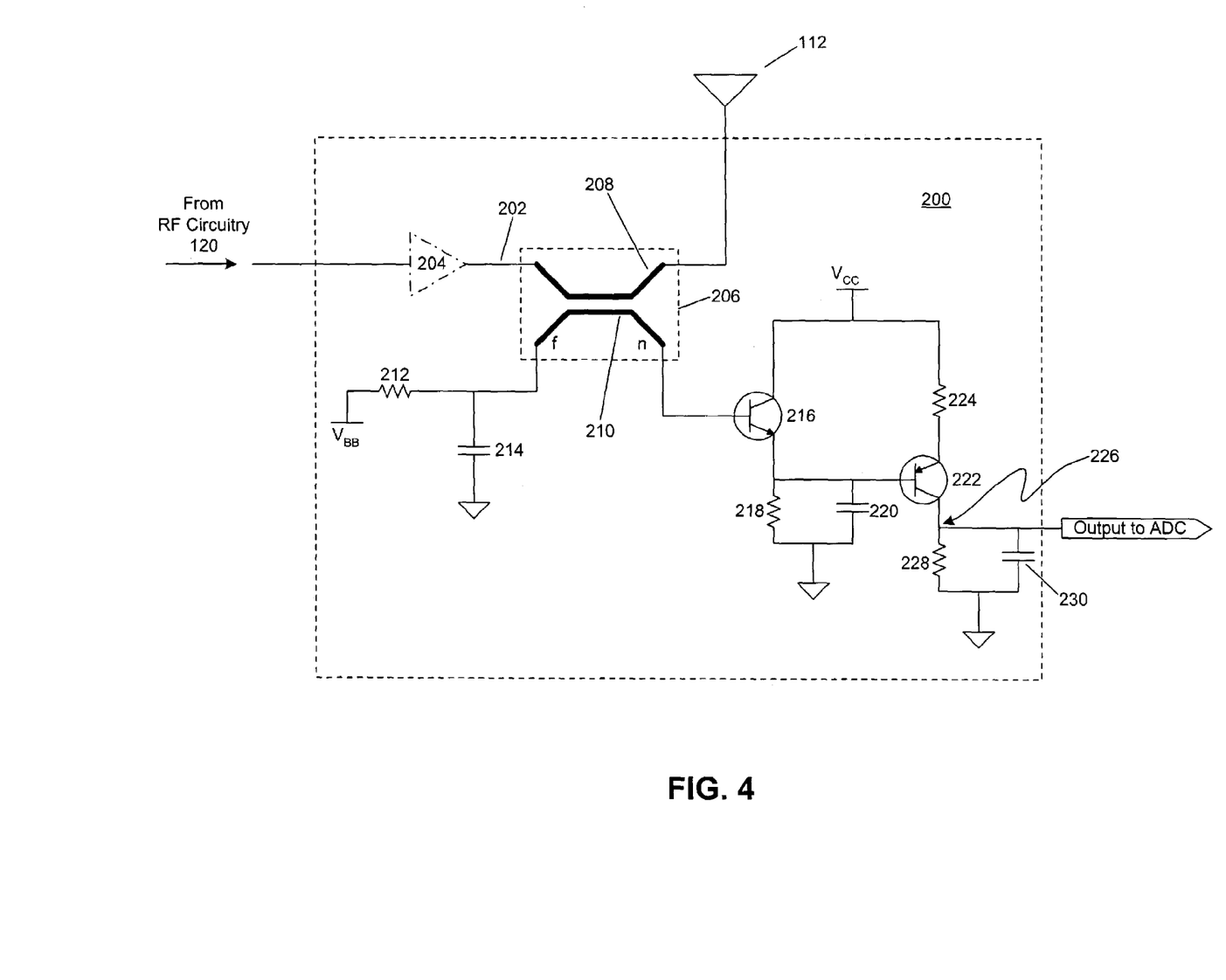
FIG. 4 is a schematic diagram for one embodiment of proximity detection circuitry according to an embodiment of the invention.

Interposed between RF circuitry 120 and antenna 112 is proximity detection circuitry 200. FIG. 4 is a schematic drawing of various components of proximity detection circuitry 200 according to one embodiment of the invention. A modulated RF signal for transmission over antenna 112 is received from RF circuitry 120 on transmission line 202. A RF amplifier 204 (shown in phantom) could also be included in proximity detection circuitry 200 to boost the RF signal strength; such an amplifier might instead (or also) be located within RF circuitry 120. Attached to transmission line 202 is a directional coupler 206. Unlike directional couplers conventionally used in higher power applications for, e.g., protection of transmitting circuitry, directional coupler 206 is instead used for proximity detection (as described more fully below). A portion of transmission line 202 forms main line 208 of directional coupler 206. In one embodiment, directional coupler 206 is a quarter wave directional coupler implemented with a microstrip design on printed circuit board 106 (FIG. 2), and has spacing chosen to provide a coupling factor yielding a suitable output voltage for ready detection on coupled line 210. For a mouse with transmitter output on the order of 1 mW, a typical coupling factor could be approximately 3 dB. In another embodiment of the invention, a directional coupler with a 10 dB coupling factor could be implemented using a FR-4 circuit laminate (having a dielectric constant of 4.3), a center frequency of 2450 MHz, and having the following dimensions:

| | |
|---|---|
| length | 1.41 cm |
| ratio of strip width to separation distance | .124 |
| ratio of strip width to circuit laminate thickness | 1.632 | where "length" refers to the length of the main line and to the length of the coupled line, "strip width" refers to the width of the strip forming the main line and the width of the strip forming the coupled line, and "separation distance" refers to the separation between the main and coupled lines.

The far end f of coupled line 210 connects to voltage source $V_{BB}$ through resistor 212. Far end f of coupled line 210 is also RF grounded via capacitor 214H. The near end n of coupled line 210 connects to the base of transistor 216. Source $V_{BB}$ provides a bias DC voltage to transistor 216, and the collector of transistor 216 is connected to voltage source $V_{CC}$. The emitter of transistor 216 is connected to ground by resistor 218 and capacitor 220, and is also connected to the base of inverting amplifier transistor 222. The emitter of amplifier transistor 222 is connected to source $V_{CC}$ via resistor 224. The collector of transistor 222 forms the output node 226 for the proximity detection circuitry 200 and is connected to ground through resistor 228. Also connecting output node 226 to ground is capacitor 230.

RF energy from coupled line 210 is proportional to the reflected power from antenna 112. As is known in the art, the Voltage Standing Wave Ratio (VSWR) is defined by $(V_O+V_R)/(V_O-V_R)$, where $V_O$ is the voltage of the outgoing RF signal on transmission line 202, and $V_R$ is the voltage of the reflected signal from antenna 112 to transmission line 202. A VSWR of 1 corresponds to antenna 112 and transmission line 202 being perfectly matched, i.e., $V_R=0$. Conversely, an infinite VSWR corresponds to a total mismatch of impedances between antenna 112 and transmission line 202 ($V_R=V_O$). If the system is designed such that the antenna 112 and the transmission line 202 are best matched when a hand is not near, VSWR rises (indicating a rise in $V_R$) when a hand approaches antenna 112. This causes an increase in the voltage placed on coupled line 210 via directional coupler 206. When a hand is not near antenna 112, VSWR will fall toward 1, corresponding to a lower $V_R$. In turn, a lesser voltage is placed on coupled line 210 via directional coupler 206. Although the invention is described by example of a system designed for optimal antenna/transmission line impedance matching with no hand present, this is not a requirement. The system could also be designed so that the antenna and transmission line are more (or most) matched when a typical or average hand is present. In such a design, VSWR would rise as a hand is removed, and decrease as a hand approaches. The choice of design could depend upon a desired tradeoff between desired RF range and whether radiation during hand detection must be minimized. If only 2–3 meters of range is required for a wireless mouse, there may be no need to maximize power input to the antenna when a hand in present.

Figure 5:
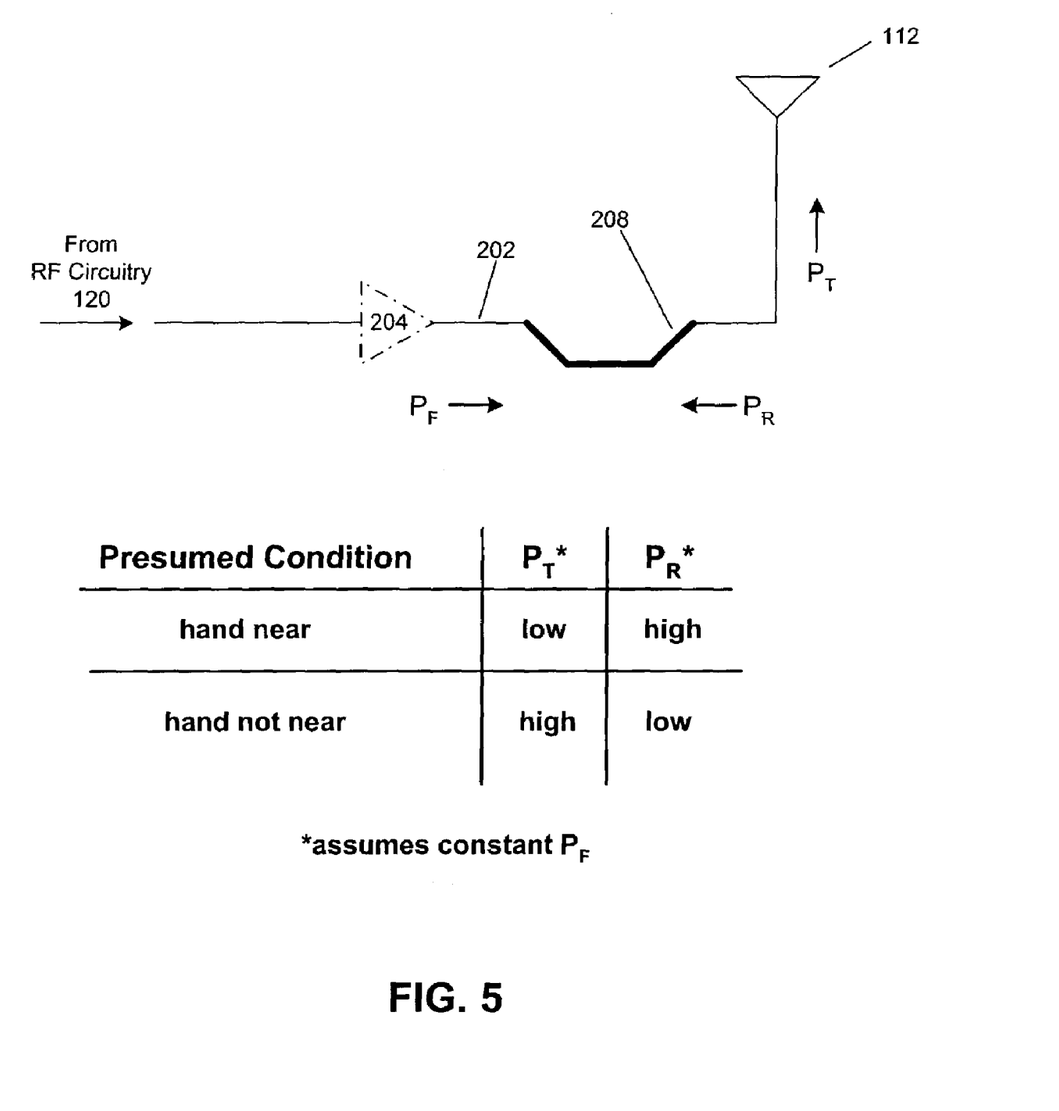
FIG. 5 is a partial schematic diagram and table showing operation of a wireless mouse in accordance with one embodiment of the invention.

FIG. 5 further illustrates the operation of the proximity detection circuitry of FIG. 4, and assumes a system designed for optimal antenna/transmission line impedance matching when no hand is present. FIG. 5 schematically shows transmission line 202, main line 208 and antenna 112 from FIG. 4. $P_F$ is the forward power of the RF signal transmitted to antenna 112 over transmission line 202. $P_T$ is the power transmitted from antenna 112, and $P_R$ is the power reflected back to transmission line 202 from antenna 112. If no hand is present, VSWR will be low. As shown in the table of FIG. 5, $V_R$ will also be low, and most or all of the forward power $P_F$ of the RF signal transmitted to antenna 112 over transmission line 202 will be transmitted through antenna 112 as $P_T$ ($P_T$ is high). There are various possible conditions under which mouse 100 might transmit to computer 2 when no hand is present (i.e., when a user is not moving the mouse or otherwise using the mouse). Mouse 100 could respond to periodic polling by computer 2 (FIG. 1) of various wireless devices. As another alternative, mouse 100 could be configured to periodically transmit a message to computer 2 to indicate the presence of mouse 100. As yet another alternative, mouse 100 could be configured to periodically transmit a message for the sole purpose of proximity detection. There might also be a need to periodically transmit battery condition.

A human hand absorbs RF energy, particularly at higher frequencies, and the RF field around antenna 112 and transmission line 202 will change when a hand approaches. Consequently, the impedance of antenna 112 will change, the impedances of antenna 112 and transmission line 202 will no longer matched (or will be less matched), and VSWR will rise. As also shown in the table of FIG. 5, less of power $P_F$ will be transmitted through antenna 112, $V_R$ is high, and $P_T$ is low. Referring to FIG. 4, a portion of this reflected power $P_R$ is output on coupled line 210 of directional coupler 206 as a coupled signal. This coupled signal imposes a radio frequency (RF) voltage upon the base of transistor 216. Transistor 216 acts as a buffer and an RF detector. In other words, by appropriately sizing resistor 218 and capacitor 220 to set the detector time constant, the voltage at the emitter of transistor 216 is a DC voltage level that varies as a function of the amplitude of the RF signal at the base. The rectified and filtered RF envelope from the transistor 216 emitter is applied to the base of inverting amplifier transistor 222. Resistors 212, 218, 224 and 228, source $V_{BB}$ and source $V_{CC}$ are chosen so that, for an expected range of reflected power, the voltage at the output node 226 varies between a chosen range. In one embodiment for a wireless computer mouse, $V_{BB}$ is approximately 1.8 volts, $V_{CC}$ is approximately 3.3 volts, resistors 224 and 228 provide a gain of approximately 5, and the output voltage at node 226 ranges from approximately 1.5 volts to approximately 3 volts. Capacitor 214 functions as a RF bypass capacitor, and prevents coupled RF energy from entering the power supply. Capacitor 230 provides filtering and stabilization at node 226 so that the voltage on that node can be more accurately sampled. In one embodiment, with a 0 dBm transmit power and 3 dB coupling factor, the RF voltage at the base of transistor 216 will be 0 mV at VSWR=1.0 and approximately 300 mV peak-to-peak at an infinite VSWR.

For convenience, the signal at the output node 226 of proximity detection circuitry 200 will be referred to as the "raw proximity value." The raw proximity value thus provides, in response to a change in impedance of antenna 112, an output voltage signal that varies over a predetermined range based on the amount of reflected power $P_R$. In other words, the raw proximity value is a voltage output which is inversely proportional to VSWR at the antenna. In turn, this can be used to provide a relative indication of the amount by which the impedance of antenna 112 has changed. When no hand is present, $P_R$ will be small (VSWR small), and very little RF voltage is applied to the base of transistor 216. The voltage at the emitter of transistor 216 is at a lower level, and the voltage at node 226 is at the upper end of its designed range. When a hand is present, $P_R$ is larger (VSWR larger), and a larger RF voltage is applied to the base of transistor 216. The voltage at the emitter of transistor 216 is thereby larger, driving down the voltage at output node 226. The raw proximity value at node 226 can be provided to an analog-to-digital converter (ADC) for conversion to a digital value (hereinafter referred to as the "converted proximity value"). Numerous types of ADC are known and can be used. As but one example, an ADC is a standard feature on many BLUETOOTH chips, and is used to monitor battery life of a device. In a wireless mouse operating in accordance with the BLUETOOTH standard, such an ADC could also be used for conversion of the raw proximity value to a converted proximity value. In other embodiments, an ADC may not be included, and the raw proximity value may be used in conjunction with a comparator circuit.

When a user is moving mouse 100 across a desk or other surface, pressing one of the buttons, using the scroll wheel, or otherwise providing input to computer 2 with mouse 100, the mouse transmitter will be active and sending data packets to computer 2. The reflected power $P_R$ can be sampled during each of these transmissions. If the mouse is transmitting a data packet corresponding to mouse motion, a button press, or some other user input, a hand is presumably present. The controller can use the corresponding present magnitude of reflected power $P_R$, as indicated by the raw or converted proximity value, as a value for calibrating hand proximity. When the magnitude of $P_R$ drops, the proximity value will rise. The controller could be configured to place mouse 100 in a sleep or other low power state when the proximity value rises above a threshold value relatively rapidly. While in the low power state, mouse 100 can continue to periodically transmit short signal bursts to check $P_R$. The proximity values from these periodic checks can be compared to the stored threshold value computed when a hand was known to be near the mouse. If a value falls below the threshold value, the mouse can wake up and prepare to receive motion or button inputs.

There can be significant variation in the effects upon a RF field caused by the hands of different individuals. Other environmental factors (e.g., humidity, other RF signals, nearby objects, etc.) can also affect RF fields around mouse 100. There may also be some variation of the proximity values (both raw and converted) generated by different mice in response to identical conditions. For example, the electrical properties of most commercially available electronic components vary over a certain tolerance range. The combined effects of variations within these tolerances can cause different systems to behave non-identically. Small manufacturing defects can also cause variations in system response.

Figure 6:
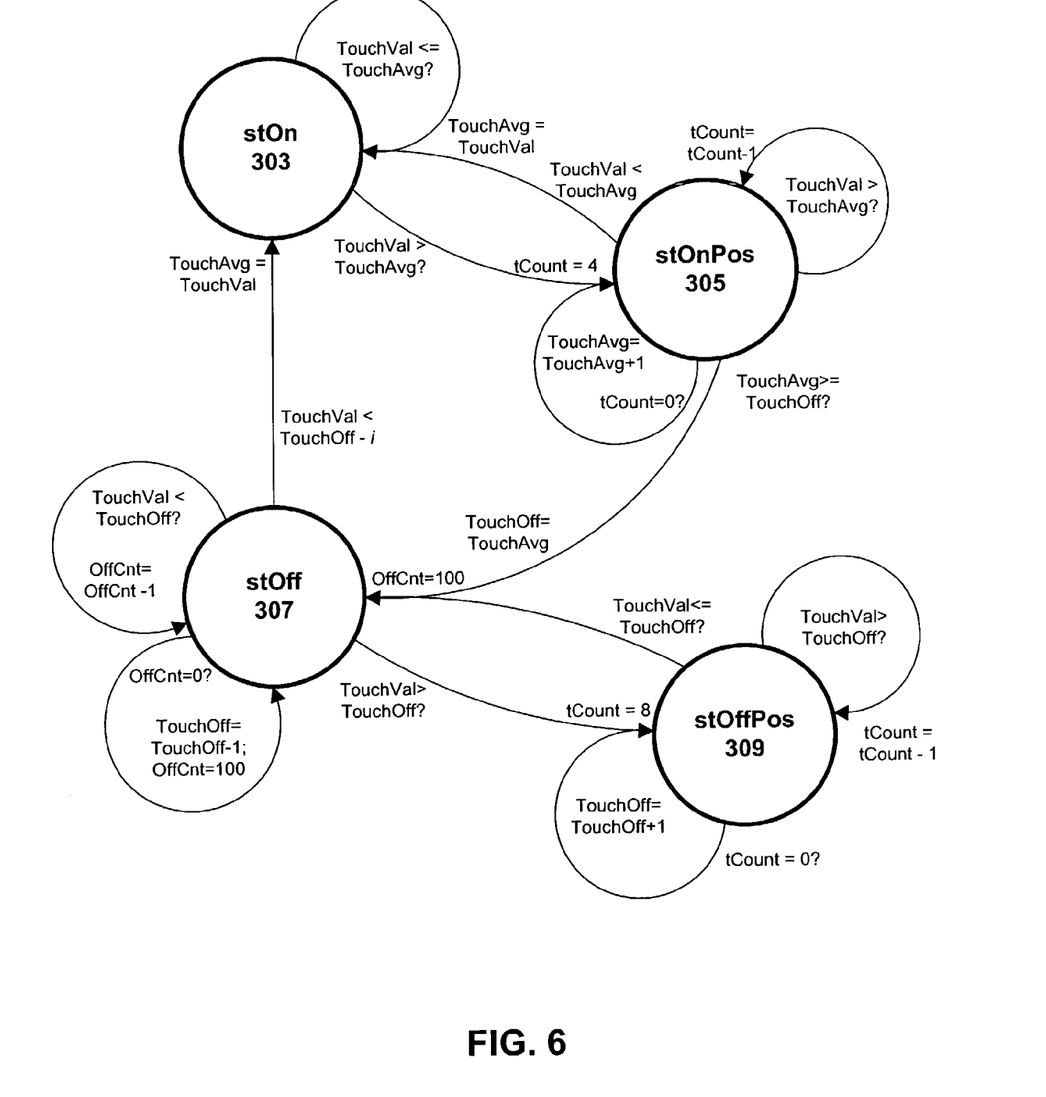
FIG. 6 is a state diagram for an adaptive sensing algorithm according to one embodiment of the invention.

Mouse 100 can be configured to adapt to such variations. An adaptive sensing algorithm is set forth in the previously-mentioned U.S. patent application Ser. No. 09/948,099, and such an algorithm can be adapted for use in connection with the present invention. FIG. 6 is a state diagram for performing an adaptive sensing algorithm in accordance with the present invention. In connection with the algorithm of FIG. 6, controller 114 of mouse 100 has a "touch" flag. When set, the touch flag indicates that a hand of the user is touching or in close proximity to mouse 100. Mouse 100 is in an "awake" or active mode, and its optical tracking and other components are powered and configured for receiving user input and transmitting data based on that input. The touch flag is cleared when it is determined that the hand of a user is not touching or in close proximity to mouse 100. When the touch flag is cleared, mouse 100 may be put into a sleep or other inactive or low power mode; various systems of mouse 100 may be powered down and/or operate with reduced frequency in order to save power. In other devices, other actions may be taken (or not taken) in response to the state of the touch flag. As a matter of convenience, the terms "touch," "touching," etc. are used in the following description of the algorithm to refer to touch and/or close proximity.

In the algorithm of FIG. 6, the touch flag (ON) is set when in the stOn state 303 or the stOnPos state 305. The touch flag is cleared (OFF) when in the stOff state 307 or in the stOffPos state 309. At appropriate intervals (e.g., 100 mS), the current proximity value is input to the algorithm. Alternatively, several samples of successive proximity values can be averaged, and the average input to the algorithm. In this manner, the effects of momentary spikes in $P_R$ caused by noisy RF environments could be minimized. The proximity value (or average of several successive values) is then used in connection with the following variables in the sensing algorithm:

| | |
|---|---|
| TouchVal | Current proximity value (or average of several recent values). |
| TouchOff | Threshold value for TouchVal which will cause a transition to an OFF (no touch) state. |
| TouchAvg | A filtered or "pseudo-average" value to which TouchVal is compared in the stOn and stOnPos states (described in more detail below). |
| tCount | A counter variable used in the different touch states (described in more detail below). |
| OffCnt | A counter variable used in one of the touch states (described in more detail below). |

In turn, the above variables control transitions between the following states:

| | |
|---|---|
| stOff: | An OFF state in which the touch flag is cleared. This state corresponds to a user not touching mouse 100. The device is waiting to transition to the stOn state and is checking for conditions for entering the stOn or stOffPos states (described below). |
| stOffPos: | An OFF state in which the touch flag is cleared. This state also corresponds to a user not touching mouse 100, but when TouchVal > TouchOff. As described in more detail below, this state is a filter and the value of TouchOff is slowly increased in this state. |
| stOn: | An ON state in which the touch flag is set. This state corresponds to a user touching mouse 100. The device checks for conditions for entering the stOnPos state (described below). |
| stOnPos: | An ON state in which the touch flag is set. This state also corresponds to a user touching mouse 100, but when TouchVal > TouchAvg. As described in more detail below, this state is a filter and the value of TouchAvg is slowly increased in this state. A check for entering the stOff or stOn states is performed here. |

Referring to FIG. 6, the algorithm transitions from stOff state 307 to stOn state 303 upon TouchVal falling a predetermined amount i below TouchOff. The value of i would depend upon the chosen range of raw proximity values, the sensitivity and number of bits of resolution of the ADC (if an ADC is used), whether the entire available range of values from the ADC is used, and the desired sensitivity of the system. For example, a particular ADC may provide 8 bits of resolution in digital output, giving a possible digital output range from 0 (i.e., the digital value "0000 0000") to 255 (i.e., the digital value "1111 1111"). However, the system could be scaled so that only the first 100 values (0–99) are used. In particular, 0 could correspond to the lowest raw proximity output value, i.e., when VSWR is lowest. The value of 99 could correspond to the highest raw proximity output value, i.e., when VSWR is infinite because of a complete impedance mismatch. The converted proximity value for when a hand is near (i.e., when optimal value<VSWR<infinite) would be somewhere between 0 and 99. Assuming such a system configuration, i could typically be set at 3. This would result in a hysteresis value on the order of 5 if the spread between converted proximity values for hand-near and hand-absent conditions is approximately 20.

Upon entering stOn 303, TouchAvg is set to TouchVal. Each time a new TouchVal is supplied, that value is compared to TouchAvg, and the algorithm remains in stOn 303 so long as TouchVal is less than or equal to TouchAvg. When in state stOn 303, the algorithm transitions to state stOnPos 305 when TouchVal increases above TouchAvg.

Upon entering stOnPos 305, the counter tCount is initially set at, e.g., 4. If the next value for TouchVal is greater than TouchAvg, tCount is decremented. If TouchVal remains greater than TouchAvg such that tCount is decremented to 0, the value of TouchAvg is incremented to TouchAvg+1. If the value of TouchVal falls below TouchAvg, the algorithm returns to stOn 303. Upon returning to stOn 303, TouchAvg is reset to TouchVal. As can be appreciated by comparing stOnPos 305 with stOn 303, stOnPos acts as a slow filter for the touch readings and prevents transition to stOff 307 because of minor fluctuations in the proximity value.

The algorithm transitions from stOnPos state 305 to stOff state 307 when TouchAvg is greater than or equal to TouchOff. In one embodiment, TouchOff is set and adjusted in the following manner. When battery 126 is first installed in mouse 100, the touch-state algorithm is initialized to the stOn state. Because it is assumed that the user is holding mouse 100 when installing battery 126, TouchAvg is then set to the current proximity value. TouchOff is then initially set to its maximum value (e.g., the raw or converted proximity value corresponding to the highest output within the prechosen range of outputs from node 226 in FIG. 4). Because TouchVal will not ordinarily reach this maximum value, the touch algorithm remains in the stOn state until mouse 100 enters an OFF or sleep state by some mechanism other than the algorithm of FIG. 6. In one preferred embodiment, mouse 100 transitions to an OFF or otherwise powered-down state after a timeout period (e.g., 180 sec.) of no mouse activity (i.e., no movement, button press, scroll wheel rotation, etc.). Because it can generally be assumed that no hand is present upon a timeout, TouchOff is reset to TouchAvg.

Upon a transition from stOnPos 305 to stOff 307, TouchOff is reset to TouchAvg and counter OffCnt is initially set at, e.g., 100. If the next value for TouchVal is less than TouchOff, but is greater than or equal to TouchOff–i, then counter OffCnt is decremented. Upon OffCnt reaching 0, then TouchOff is decremented, and OffCnt is reset to 100. In this manner, mouse 100 can adaptively learn a lower TouchOff value when mouse 100 is moved to a more RF absorptive environment or when being used by a person with a more RF-absorptive hand. If TouchVal falls below TouchOff–i, the algorithm transitions to stOn 303, and TouchAvg is reset to TouchVal.

If, during stOff state 307, TouchVal rises above a current value of TouchOff, a state stOffPos 309 is entered wherein the counter tCount is initially set at, e.g., at 8. For each cycle in stOffPos 309 in which TouchVal remains higher than TouchOff, tCount is decremented. If TouchVal remains higher than TouchOff long enough for tCount to reach 0, the value of TouchOff is incremented to TouchOff+1 and tCount is reset to 8. Upon TouchAvg being equal to or less than TouchOff, the algorithm transitions to stOff 307. The stOffPos state 309 allows mouse 100 to learn a higher TouchOff value when mouse 100 is moved to a less RF absorptive environment or is used by a person with a less RF-absorptive hand.

FIG. 6 is only one example of a state diagram for performing an adaptive sensing algorithm in accordance with the present invention. The counter variables could be varied if an ADC with more or less bits of resolution is used, as well as if changes in antenna geometry affected impedance mismatch sensitivity. As previously indicated, a proximity detection system according to the invention could be designed so that antenna and transmission line impedances are most matched when a hand is near. The algorithm of FIG. 6 could still be used in such a design. The circuit described above could be modified to reverse the raw proximity output polarity, or various steps in the algorithm could be inverted (e.g., change "<" to ">") as required. Such hardware and software modifications are within the ability of a person skilled in the art once such a person is provided with the information contained herein.

Moreover, the algorithm of FIG. 6 is merely one manner in which a proximity detection system according to the invention can be configured to adapt its detection threshold to changing environmental conditions, to different users, to differences among mice based on manufacturing differences, etc. As another possibility, mouse 100 could be configured to sleep and reset a threshold value for detecting a hand touch after a certain period (e.g., 2 minutes) of no mouse movement, button press, or other user activity. If the proximity value then falls a certain amount below the reset threshold, the mouse could be configured to wake up. Mouse 100 might also (or alternatively) be configured to store and average a larger number of recent proximity values (e.g., the last 25 values, the last 100 values, etc.). This average can then be used as a detection threshold in order to avoid effects of noisy RF environments.

Although specific examples of carrying out the invention have been described, those skilled in the art will appreciate that there are numerous variations and permutations of the above described systems and techniques that fall within the spirit and scope of the invention as set forth in the appended claims. For example, the system could be used in conjunction with other algorithms for which there may be multiple ON states (e.g., active, idle, extended idle, etc.), and in which the mouse might deactivate successively more systems. The invention could also be used in devices other than a mouse, and for purposes other than power management. The circuit and algorithms described herein are only examples of possible circuits and algorithms in which the invention might be implemented; other circuits and/or algorithms could be used. A device according to the invention could produce RF power on the order of 10 mW or more. These and other modifications are within the scope of the invention as defined by the attached claims.

The invention claimed is:

1. A proximity detection system for sensing the presence of an object or body portion in contact with or close proximity to another object, comprising:
   a radio frequency (RF) signal source providing RF signals;
   a transmission pathway connected to the RF source;
   an antenna connected to the transmission pathway;
   a directional coupler having a main line in electrical communication with the transmission pathway and a coupled line, the directional coupler producing a signal on the coupled line which varies in response to changes in antenna and transmission line impedance matching caused by presence of an object or body portion;

a signal detector in electrical communication with the coupled line and responsive to signals produced in the coupled line by the main line, wherein the signal detector produces an output signal that is within an output range, the output range corresponding to a range of antenna-transmission line impedance mismatch; and a controller in communication with the signal detector, the controller configured to provide, in relation to the output signal, a state signal indicative of the presence or absence of an object or body portion in contact with or close proximity to another object.

2. The proximity detection system of claim 1, wherein the RF signal source provides RF signals at frequencies above 850 MHz.

3. The proximity detection system of claim 1, wherein the RF signal source provides RF signals at frequencies between 2.4 GHz and 2.483 GHz.

4. The proximity detection system of claim 1, wherein the RF signal source provides RF signals at frequencies between 5.725 GHz and 5.850 GHz.

5. The proximity detection system of claim 1, wherein the RF signal source provides RF signals of a power not exceeding approximately 10 mW.

6. The proximity detector of claim 1, wherein the controller is further configured to adjust one or more criteria by which the state signal is determined.

7. The proximity detector of claim 1, further comprising an Analog to Digital Converter (ADC) for converting the output signal to a digital value, and wherein the controller receives the digital value of the output signal.

8. The proximity detector of claim 1, wherein the controller is further configured to determine the state signal based upon multiple recent indications of output signal value.

9. The proximity sensor of claim 8, wherein the controller averages multiple recent indications of output signal value and determines the state signal based on the average of the multiple recent values.

10. The proximity detector of claim 1, wherein the controller is further configured to:
determine a value (TouchVal) relating to the output signal, and
generate, based upon TouchVal, a signal indicative of an ON state wherein an object or body portion is in contact with or close proximity to another object, and an OFF state wherein the object or body portion is not in contact with or close proximity to the other object.

11. The proximity detector of claim 10, wherein TouchVal is a moving average value.

12. The proximity detector of claim 10, wherein the controller is further configured to:
compare TouchVal, or a number derived from TouchVal, with a predetermined threshold value (TouchOff), or a number derived from TouchOff, and
generate the ON and OFF state indicating signals based upon the comparison.

13. The proximity detector of claim 12, wherein the controller is further configured to dynamically adjust the value of TouchOff.

14. The proximity detector of claim 13, wherein the controller is configured to dynamically adjust the value of TouchOff to adapt to fluctuations in the RF absorption characteristics of the environment or among different users.

15. The proximity detector of claim 13, wherein the controller is further configured to derive a value (TouchAvg) from TouchVal, and wherein the controller compares TouchAvg with TouchOff while in a state in which an ON state indicating signal is generated.

16. The proximity detector of claim 15, wherein the controller is further configured to:
initially set TouchAvg equal to TouchVal upon a transition from a state in which an OFF state indicating signal is generated to a state in which an ON state indicating signal is generated, and
increment the value of TouchAvg upon TouchVal exceeding TouchAvg for a predetermined interval.

17. The proximity detector of claim 16, wherein the controller is further configured to adapt to fluctuations in the RF absorption characteristics of the environment or among different users based upon an increase in TouchVal while in a state in which an OFF state indicating signal is generated.

18. The proximity detector of claim 17, wherein the controller adapts to fluctuations in RF absorption characteristics based upon TouchVal remaining above TouchOff for a predetermined interval.

19. The proximity detector of claim 12, wherein the controller is configured to transition, upon TouchVal decreasing below TouchOff by a predetermined amount, from a state in which an OFF state indicating signal is generated to a state in which an ON state indicating signal is generated.

20. The proximity detector of claim 12, wherein the controller is configured to decrement TouchOff upon TouchVal remaining below TouchOff for a predetermined interval.

21. The proximity detector of claim 12, wherein the controller is further configured to derive a value (TouchAvg) from TouchVal, and wherein the controller compares TouchAvg with TouchOff while in a state in which an ON state indicating signal is generated.

22. The proximity detector of claim 1, wherein the signal detector comprises a RF envelope detector and an amplifier.

23. A user input device, comprising
a controller for generating data in response to manipulation of the input device by a human user;
a radio frequency (RF) signal source providing modulated RF signals for transmission of the data to another device;
a transmission pathway connected to the RF source;
an antenna connected to the transmission pathway;
a directional coupler having a main line in electrical communication with the transmission pathway and a coupled line, the directional coupler producing a signal on the coupled line which varies in relation to an amount of modulated RF signal energy reflected back to the transmission line from the antenna because of mismatches in antenna and transmission line impedances; and
a signal detector in electrical communication with the coupled line and responsive to signals produced in the coupled line by the main line, the signal detector producing a detection signal having a value that varies in relation to the signal produced on the coupled line.

24. The user input device of claim 23, further comprising a power supply, and wherein the controller is configured to place the input device in a power conserving state based upon detection signal values.

25. The user input device of claim 23, further comprising a housing and a button located on the housing, and wherein manipulation of the input device by a human user includes actuation of the button.

26. The user input device of claim 23, wherein the RF signal source provides RF signals at frequencies above 850 MHz.

27. The user input device of claim 23, wherein the RF signal source provides RF signals at frequencies between 2.4 GHz and 2.483 GHz.

28. The user input device of claim 23, wherein the RF signal source provides RF signals at frequencies between 5.725 GHz and 5.850 GHz.

29. The user input device of claim 23, wherein the controller is further configured to provide, in relation to the detection signal, a state signal indicative of the presence or absence of an object or body portion in contact with or close proximity to the input device, and wherein the controller is further configured to adjust one or more criteria by which the state signal is determined.

30. The user input device of claim 29, wherein the controller is further configured to determine the state signal based upon multiple recent indications of detection signal value.

31. The user input device of claim 23, further comprising an analog-to-digital converter for converting the detection signal to a digital value, and wherein the controller receives the digital value of the detection signal.

32. The user input device of claim 23, wherein the controller is further configured to:
  determine a value (TouchVal) relating to the detection signal value, and
  generate, based upon TouchVal, a signal indicative of an ON state wherein a user body portion is in contact with or close proximity to the input device, and a power-conserving OFF state wherein a user body portion is not in contact with or close proximity to the input device.

33. The user input device of claim 32, wherein TouchVal is a moving average value.

34. The user input device of claim 32, wherein the controller is further configured to:
  compare TouchVal, or a number derived from TouchVal, with a predetermined threshold value (TouchOff), or a number derived from TouchOff, and
  generate the ON and OFF state indicating signals based upon the comparison.

35. The user input device of claim 34, wherein the controller is further configured to dynamically adjust the value of TouchOff.

36. The user input device of claim of claim 35, wherein the controller is configured to dynamically adjust the value of TouchOff to adapt to fluctuations in the RF absorption characteristics of the environment or among different users.

37. The user input device of claim 34, wherein the controller is further configured to derive a value (TouchAvg) from TouchVal, and wherein the controller compares TouchAvg with TouchOff while in a state in which an ON state indicating signal is generated.

38. The user input device of claim 37, wherein the controller is further configured to:
  initially set TouchAvg equal to TouchVal upon a transition from a state in which an OFF state indicating signal is generated to a state in which an ON state indicating signal is generated, and
  increment the value of TouchAvg upon TouchVal exceeding TouchAvg for a predetermined interval.

39. The user input device of claim 38, wherein the controller is further configured to adapt to a change in the RF absorption characteristics of the environment or among different users based an increase in TouchVal while in a state in which an OFF state indicating signal is generated.

40. The user input device of claim 39, wherein the controller adapts to change in RF absorption characteristics based upon TouchVal remaining above TouchOff for a predetermined interval.

41. The user input device of claim 34, wherein the controller is configured to transition, upon TouchVal decreasing below TouchOff by a predetermined amount, from a state in which an OFF state indicating signal is generated to a state in which an ON state indicating signal is generated.

42. The user input device of claim 34, wherein the controller is configured to decrement TouchOff upon TouchVal remaining below TouchOff for a predetermined interval.

43. The user input device of claim 34, wherein the controller is further configured to derive a value (TouchAvg) from TouchVal, and wherein the controller compares TouchAvg with TouchOff while in a state in which an ON state indicating signal is generated.

* * * * *